(12) United States Patent
Koehler

(10) Patent No.: US 7,888,443 B2
(45) Date of Patent: Feb. 15, 2011

(54) SOLID POLYVINYL ESTER AND POLY(METH)ACRYLATE RESINS WITH HIGH POLYDISPERSITY

(75) Inventor: Thomas Koehler, Kastl (DE)

(73) Assignee: Wacker Chemie AG, Munich (DE)

( * ) Notice: Subject to any disclaimer, the term of this patent is extended or adjusted under 35 U.S.C. 154(b) by 282 days.

(21) Appl. No.: 12/096,309

(22) PCT Filed: Nov. 24, 2006

(86) PCT No.: PCT/EP2006/068877
§ 371 (c)(1),
(2), (4) Date: Jun. 5, 2008

(87) PCT Pub. No.: WO2007/065804
PCT Pub. Date: Jun. 14, 2007

(65) Prior Publication Data
US 2008/0262152 A1    Oct. 23, 2008

(30) Foreign Application Priority Data
Dec. 8, 2005    (DE) ................. 10 2005 058 744

(51) Int. Cl.
*C08F 218/04* (2006.01)
*C08F 218/08* (2006.01)

(52) U.S. Cl. ..................................................... 526/330

(58) Field of Classification Search ................. 524/459; 526/89
See application file for complete search history.

(56) References Cited

U.S. PATENT DOCUMENTS

| 5,380,790 A | 1/1995 | Chen et al. |
| 2005/0267274 A1 | 12/2005 | Lai |

FOREIGN PATENT DOCUMENTS

| DE | 1060142 | 6/1959 |
| DE | 1745570 | 4/1972 |
| DE | 202004014691 U1 | 12/2004 |
| EP | 1957549 B1 | 5/2010 |

OTHER PUBLICATIONS

Sosa et al. Polymer 42 (2001) 6923-6928.*
The Polymer Handbook, J. Wiley & Sons, New York (1999).

* cited by examiner

*Primary Examiner*—David Wu
*Assistant Examiner*—Vu A Nguyen
(74) *Attorney, Agent, or Firm*—Brooks Kushman P.C.

(57) ABSTRACT

Polyvinyl esters in the form of solid resins are obtained by free-radically initiated suspension polymerization, characterized in that the solid resin for a weight-average molecular weight Mw of <300,000 has a polydispersity PD of ≧5 and for a weight-average molecular weight Mw of 300,000 to 1,500,000 has a polydispersity PD of ≧10.

14 Claims, No Drawings

SOLID POLYVINYL ESTER AND POLY(METH)ACRYLATE RESINS WITH HIGH POLYDISPERSITY

CROSS-REFERENCE TO RELATED APPLICATION

This application is the U.S. national phase of PCT Appln. No. PCT/EP2006/068877 filed Nov. 24, 2006 which claims priority to German application DE 10 2005 058 744.5 filed Dec. 8, 2005.

BACKGROUND OF THE INVENTION

1. Field of the Invention

The invention relates to solid polyvinyl ester and poly (meth)acrylate resins with high polydispersity, processes for preparing them, and their use.

2. Description of the Related Art

In the preparation of solvent-based adhesive compositions it is common to use solid polyvinyl acetate resins, on account of their excellent adhesion to a multiplicity of substrates (DE 20 2004 014 691 U1). DE 1 060 142 AS recommends using solid, low molecular weight polyvinyl acetate resins with a narrow molecular weight distribution to produce adhesives and paints. For that purpose the solid resin is prepared by the suspension polymerization process, with catalyst and regulator used in an equimolar ratio with respect to one another, and being metered in continuously together with the monomers in order to maintain a constant monomer concentration. In order to improve the solubility of solid vinyl acetate-ethylene copolymer resins in the organic solvents typical for adhesives, DE 1 745 570 OS recommends accompanying their preparation by the use of aliphatic aldehydes having a chain length of 4 to 8 C atoms.

One of the decisive factors affecting the strength of the adhesive bond (cohesion) is the molecular weight of the solid polyvinyl acetate resin employed. The higher the molecular weight, the higher the strength that can be achieved. The increase in the molecular weight of the resin, however, is paralleled, for otherwise identical polymer composition, by an increase in the viscosity of the resin solution. If the intention is to set a particular viscosity which is favourable for the application, in an adhesive based on a relatively high molecular weight resin, it is then necessary, for a given amount of resin, to employ a greater amount of solvent. Because of the emission of solvents as adhesives cure, however, the actual aim is to reduce the amount of solvent as far as is possible.

SUMMARY OF THE INVENTION

The object was therefore to provide solid polyvinyl ester and poly(meth)acrylate resins, especially solid polyvinyl acetate resins, which are optimized for adhesiveness with respect to the aforementioned profile of properties: that is, solid resins displaying a much lower solution viscosity for a given average molecular weight than solid resins known from the prior art. These and other objects are provided by providing solid polyvinyl ester and poly(meth)acrylate resins with a broad molecular weight distribution.

DETAILED DESCRIPTION OF THE PREFERRED EMBODIMENTS

Surprisingly it has been found that solid resins of the kind having a broader molecular weight distribution than is typical for resins of otherwise identical average molecular weight, exhibit a significantly lower solution viscosity, while the adhesive bonds produced with such products at the same time develop comparable strength. Using such resins, then, it is possible to provide adhesive formulations which in order to set a comparable viscosity require lower amounts of solvent and hence also exhibit less emission on curing.

Established commercial solid polyvinyl ester resins exhibit a polydispersity which is dependent on the molecular weight. The higher the molecular weight, the higher, too, the polydispersity: the breadth of the molecular weight distribution. For a defined molecular weight, however, there is no variation in the molecular weight distribution. Common types of resins, for example those with a weight-average molecular weight Mw of 110,000 to 150,000, have a polydispersity of 3.5.

The invention provides polyvinyl esters and poly(meth) acrylates in the form of their solid resins, obtainable by means of free-radically initiated suspension polymerization, characterized in that the solid resin for a weight-average molecular weight Mw of <300,000 has a polydispersity PD of >5 and for a weight-average molecular weight Mw of 300,000 to 1,500,000 has a polydispersity PD of >10.

The invention further provides a process for preparing polyvinyl esters and poly(meth)acrylates in the form of their solid resins, by means of free-radically initiated suspension polymerization in aqueous medium from vinyl ester or (meth) acrylate base monomer and if desired up to 50% by weight, based on the total weight of the monomers, of further monomers copolymerizable therewith, in the presence of one or more molecular weight regulator compounds, characterized in that the molecular weight regulator compound is added such that the molar ratio of regulator to free monomer increases during the course of the polymerization.

Suitable vinyl ester base monomers are vinyl esters of unbranched or branched alkylcarboxylic acids having 1 to 18 C atoms. Preference is given to vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having 9 to 13 C atoms, such as VeoVa9$^R$ or VeoVa10$^R$ (trade names of the company Resolutions), for example. Vinyl acetate is particularly preferred. Suitable methacrylic or acrylic ester base monomers are acrylic or methacrylic esters of branched or unbranched alcohols or diols having 1 to 18 C atoms. Preference is given to methyl(meth)acrylate, ethyl(meth)acrylate, n-butyl(meth) acrylate, tert-butyl(meth)acrylate and 2-ethylhexyl acrylate. Methyl methacrylate is particularly preferred. The most preferred resins are solid polyvinyl acetate resins and solid polymethacrylate resins.

As well as the respective base monomer, the solid polyvinyl ester or poly(meth)acrylate resins may, if desired, also contain further monomer units. Comonomers different from the base monomer are copolymerized generally in an amount of ≦50% by weight, preferably 1% to 40% by weight, based in each case on the total weight of the monomers. Suitable comonomers are one or more monomers from the group encompassing vinyl esters of unbranched or branched alkylcarboxylic acids having 1 to 18 C atoms, acrylic esters or methacrylic esters of branched or unbranched alcohols or diols having 1 to 18 C atoms, ethylenically unsaturated monocarboxylic and dicarboxylic acids, their salts, and also their amides or N-methylolamides and nitriles, ethylenically unsaturated sulphonic acids and their salts, silane-functional ethylenically unsaturated compounds, ethylenically unsaturated heterocyclic compounds, alkyl vinyl ethers, vinyl ketones, dienes, olefins, vinylaromatics, and vinyl halides.

Suitable vinyl esters are vinyl acetate, vinyl propionate, vinyl butyrate, vinyl 2-ethylhexanoate, vinyl laurate, 1-methylvinyl acetate, vinyl pivalate, and vinyl esters of α-branched monocarboxylic acids having 9 to 13 C atoms, such as VeoVa9$^R$ or VeoVa10$^R$ (trade names of the company Resolutions), for example.

Examples of methacrylic esters or acrylic esters are methyl (meth)acrylate, ethyl(meth)acrylate, n-butyl(meth)acrylate, tert-butyl(meth)acrylate, 2-ethylhexyl(meth)acrylate, hydroxyethyl(meth)acrylate, hydroxypropyl(meth)acrylate and glycidyl(meth)acrylate.

Examples of suitable ethylenically unsaturated monocarboxylic and dicarboxylic acids, their salts and also their amides or N-methylolamides and nitriles are acrylic acid, methacrylic acid, crotonic acid, itaconic acid, fumaric acid, maleic acid, acrylamide, N-methylolacrylamide, N-methylolmethacrylamide and acrylonitrile and methacrylonitrile. Examples of ethylenically unsaturated sulphonic acids are vinylsulphonic acid and 2-acrylamido-2-methylpropanesulphonic acid. Suitable ethylenically unsaturated heterocyclic compounds are N-vinylpyrrolidone, vinylpyridine, N-vinylimidazole and N-vinylcaprolactam. Also suitable are cationic monomers such as diallyldimethylammonium chloride (DADMAC), 3-trimethyl-ammoniopropyl(meth)acrylamide chloride (MAPTAC) and 2-trimethylammonioethyl(meth) acrylate chloride.

Preferred vinylaromatics are styrene, α-methylstyrene and vinyltoluene. Preferred vinyl halides are vinyl chloride, vinylidene chloride and vinyl fluoride. The preferred olefins are ethylene and propylene and the preferred dienes are 1,3-butadiene and isoprene.

Preferred alkyl vinyl ethers are ethyl vinyl ether, n-butyl vinyl ether, isobutyl vinyl ether, tert-butyl vinyl ether, cyclohexyl vinyl ether, octadecyl vinyl ether, hydroxybutyl vinyl ether and cyclohexanedimethanol monovinyl ether. Other suitable ethylenically unsaturated monomers are vinyl methyl ketone, N-vinylformamide, N-vinyl-N-methylacetamide, vinylcarbazole and vinylidene cyanide.

Examples of ethylenically unsaturated silanes are γ-acryloyl- and γ-methacryloyloxypropyltri(alkoxy)silanes, α-methacryloyloxymethyltri(alkoxy)silanes, γ-methacryloyloxypropylmethyl-di(alkoxy)silanes, vinylalkyldi(alkoxy)silanes and vinyl-tri(alkoxy)silanes, examples of alkoxy groups which can be used being methoxy, ethoxy, propoxy, isopropoxy, methoxy-ethylene, ethoxyethylene, methoxypropylene glycol ether and/or ethoxypropylene glycol ether radicals.

Further examples of suitable monomers are precrosslinking comonomers such as polyethylenically unsaturated comonomers, examples being divinyl adipate, divinylbenzene, diallyl maleate, allyl methacrylate, butanediol diacrylate and triallyl cyanurate, and postcrosslinking comonomers, examples being acrylamidoglycolic acid (AGA), methylacrylamidoglycolic acid methyl ester (MAGME), N-methylolacrylamide (NMA), N-methylolmethacrylamide, N-methylolallylcarbamate, alkyl ethers such as the isobutoxy ether or esters of N-methylol-acrylamide, of N-methylolmethacrylamide and of N-methylol-allylcarbamate.

Preference is given to the following solid copolymer resins: solid vinyl acetate-vinyl chloride, vinyl acetate-n-butyl acrylate, vinyl acetate-methyl methacrylate, vinyl acetate-hydroxyethyl acrylate, vinyl acetate-2-ethylhexyl acrylate and vinyl acetate-crotonic acid resins and solid resins of copolymers of vinyl chloride with vinyl acetate and unsaturated monocarboxylic or dicarboxylic acids.

The polydispersity, PD, is the ratio Mw/Mn of weight-average molecular weight Mw to number-average molecular weight Mn. Mn and Mw are determined by means of size exclusion chromatography (SEC) against polystyrene standard in THF at 40° C. using a flow rate of 1.2 ml/min and RI (reflective index) detection on a Styragel HR3-HR4-HR5-HR5 column set from Waters Corp., USA, with an injection volume of 100 µl.

Preference is given to solid resins having a PD of >6 for a molecular-weight Mw of <300,000. Particular preference is given to solid resins having a PD of 5 to 10 for a molecular weight Mw of 100,000 to <300,000, having a PD of 10 to 20 for a molecular weight Mw of 300,000 to 500,000, and having a PD of 15 to 50 for a molecular weight Mw of 500,000 to 1,500,000.

The most preferred solid resins are those having a PD of 5 to 7 for Mw of 100,000 to 150,000, having a PD of 6 to 10 for Mw of 150,000 to 200,000, having a PD of 7 to 15 for Mw of 200,000 to 250,000, having a PD of 8 to 20 for Mw of 250,000 to 300,000, having a PD of 10 to 20 for Mw of 300,000 to 500,000, having a PD of 15 to 40 for Mw of 500,000 to 800,000, and having a PD of 20 to 50 for Mw of 800,000 to 1,500,000.

The solid resins of the invention are additionally distinguished by the fact that rather than a broad molecular weight distribution they may also have a bimodal, trimodal or polymodal distribution.

The suspension polymerization process generally involves charging a reactor with an aqueous suspension medium which for the purpose of stabilizing the suspension contains surface-active substances such as protective colloids, in combination where appropriate with emulsifiers. It is preferred to use 0.001% to 5.0% by weight, more preferably 0.001% to 2.0% by weight, of surface-active substance. Polymerization takes place preferably only in the presence of protective colloid. Examples of suitable protective colloids include partly hydrolysed polyvinyl alcohols, polyvinylpyrrolidones, polyvinyl acetals, starches, celluloses and their carboxymethyl, methyl, hydroxyethyl and hydroxypropyl derivatives. Suitable emulsifiers are anionic, cationic and nonionic emulsifiers, examples being anionic surfactants, such as alkyl sulphates having a chain length of 8 to 18 C atoms, alkyl or alkylaryl ether sulphates having 8 to 18 C atoms in the hydrophobic radical and up to 60 ethylene oxide or propylene oxide units, alkyl- or alkylarylsulphonates having 8 to 18 C atoms, full esters and monoesters of sulphosuccinic acid with monohydric alcohols or alkylphenols, or nonionic surfactants such as alkyl polyglycol ethers or alkylaryl polyglycol ethers having up to 60 ethylene oxide and/or propylene oxide units.

The base monomer and any further comonomers may be included in their entirety in the initial charge, metered in in their entirety, or included in fractions in the initial charge, with the remainder being metered in after the initiation (start) of the polymerization. Preferably the base monomer and any further comonomers are included in their entirety in the initial charge, and the regulator is metered in. In a further preferred embodiment a monomer fraction of 90% to 99% by weight, based on the total weight of the monomers, is included in the initial charge, and the remainder, and the regulator, are metered in.

The regulator is metered in only after a monomer conversion of 1% to 50% has been reached, most preferably at 10% to 50% monomer conversion. The regulator can be metered in as a surge, in other words within 1 to 15 minutes. The regulator can also be metered in continuously, preferably over 20% to 50% of the polymerization time, which corresponds in general to a period of 1 to 4 hours.

The polymerization is started by addition of initiator and heating to polymerization temperature. The start of the polymerization is the time at which the polymerization temperature is attained and an exotherm is observed. The initiator may be included wholly or partly with the monomers in the initial charge or else may be metered in in its entirety.

The polymerization is initiated using the customary, monomer-soluble initiators or redox initiator combinations. Examples of monomer-soluble initiators are dicetyl peroxydicarbonate, di(2-ethylhexyl) peroxydicarbonate, 1,1-bis(tert-butylperoxy)-3,3,5-trimethylcyclohexane, di(4-tert-butylcyclohexyl) peroxydicarbonate, dicyclohexyl peroxydicarbonate, dibenzoyl peroxide, dilauroyl peroxide, tert-amyl peroxypivalate, tert-butyl perneodecanoate, tert-butyl peroxy-2-ethylhexanoate, tert-butyl perpivalate or azo initiators such as azoisobutyronitrile.

The stated initiators are used generally in an amount of 0.01% to 10.0% by weight, preferably 0.01% to 3.0% by weight, more preferably 0.01% to 1.0% by weight, based in each case on the total weight of the monomers. Redox initiators used are combinations of the stated oil-soluble initiators together with reducing agents. Suitable reducing agents are the sulphites and bisulphites of the alkali metals and of ammonium, for example sodium sulphite, the derivatives of sulphoxylic acid such as zinc or alkali metal formaldehyde-sulphoxylates, sodium hydroxymethanesulphinate for example, and ascorbic acid. The amount of reducing agent is generally 0.01% to 10.0% by weight, preferably 0.01% to 1.0% by weight, based in each case on the total weight of the monomers.

The reaction is carried out in an inert atmosphere, generated by flushing with nitrogen, in order to eliminate air and oxygen. After heating with stirring to 30° C. to 90° C., preferably 50° C. to 70° C., the polymerization starts. The reaction mixture is held at reaction temperature with stirring for 2 to 20 hours, with 4 to 10 hours generally being sufficient to achieve a conversion of >90%.

Suitable molecular weight regulator compounds are known to one skilled in the art. A listing of suitable regulators (chain transfer agents) is found in "Polymer Handbook" by Brandrup, Immergut and Grulke, J. Wiley (1999). Examples of typical regulators include aliphatic aldehydes, preferably having 1 to 4 C atoms, such as formaldehyde, acetaldehyde, propionaldehyde, n-butyraldehyde and isobutyraldehyde. Also suitable are monohydric or polyhydric alcohols, preferably of 1 to 6 C atoms, such as isopropanol, n-butanol, isobutanol, glycol and glycerol. It is also possible to use mercapto compounds, preferably of 1 to 12 C atoms, such as mercaptopropionic acid, mercaptoethanol, mercaptopropanol, mercaptobutanols, mercaptohexanol, butyl mercaptans and thioglycolic acid. Solvents such as acetone and toluene are also suitable. Regulation can also be effected using comonomers having a regulator effect. In the case of vinyl ester base monomer these are preferably (meth)acrylates, more preferably glycidyl(meth)acrylate, 2-ethylhexyl acrylate and n-butyl acrylate. The most preferred are aliphatic aldehydes having 1 to 4 C atoms, especially n-butyraldehyde.

The amount of regulator depends on the target molecular weight and on the transfer constant. The transfer constants are described in "Polymer Handbook" by Brandrup, Immergut and Grulke, J. Wiley (1999). On the basis of these data one skilled in the art is able to estimate the appropriate amount of regulator. In the case of butyraldehyde it is preferred to use 0.01 to 15 mol % of regulator, based on the monomer fraction. It is important to add the regulator in such a way that the molar ratio of regulator to free monomer increases during the course of the polymerization. In this way the concentration of molecular weight regulator rises over the course of the polymerization and does not decrease over the course of polymerization, as would be the case if the regulator were merely to be included in the initial charge. The molecular weight regulator can be included in part in the initial charge if the course of the polymerization is otherwise too exothermic, and the remainder of the regulator can be added as a surge or else metered in continuously, starting from the beginning of reaction, over a defined time period, together with a portion of the monomer.

After the polymerization has come to an end, the suspension polymer can be freed by distillation from unconverted monomers or from added and unreacted molecular weight regulator. Thereafter the beads produced are separated from the suspension medium, which if desired can be used again for the next suspension polymerization batch, and the beads are washed with water and dried. The resin prepared by suspension polymerization is obtained in the form of beads or microspheres, having a diameter of 0.1 mm to 3.0 mm.

Fields of use for the solid resins of the invention are all applications in which solid polyvinyl acetate resins have already been used to date, particularly as binders for coating materials and adhesives. Preference is given to their application in solvent-borne adhesives such as parquet adhesives and all-purpose adhesives or in hot-melt adhesives. Preference is given to their use as low profile additives and as an addition to soundproofing mats.

General Instructions for the Inventive and Comparative Examples:

A 3-liter reactor was charged with 900 g of an aqueous 0.5% strength polyvinyl alcohol solution (degree of hydrolysis 88 mol %; Höppler viscosity, in 4% strength aqueous solution at 20° C. to DIN 53015, 18 mPas) and 500 g of vinyl acetate and 0.5 g of tert-butyl peroxy-2-ethylhexanoate were added with stirring. After a flushing with nitrogen, the reaction mixture was heated to 50° C. and held at this temperature for 5 hours. When the polymerization temperature of 50° C. was reached and the exothermic reaction commenced, the regulator indicated in the table was added, in the amount identified therein and from the time specified therein. At the end of the 5-hour polymerization time the reaction was completed by stirring at 80° C. for a further 2 hours. After the suspension had been cooled with stirring, the beads were isolated by filtration, washed with water and then dried.

The solid resins from the inventive and comparative examples assembled in Table 1 were subsequently tested in a typical adhesive formulation. Parameters evaluated were the Brookfield viscosity of the ready-to-use formulation and the DIN 68602 tensile shear strength of the adhesive bond.

The formulation consisted of the following ingredients and amounts:

21% by weight of the resin from Table 1

15% by weight of polyvinyl acetate resin (VINNAPAS$^R$ B60)

32% by weight of methyl acetate

32% by weight of 99% ethanol

Comparing the results of Inventive Example 1 with Comparative Example 5 from Table 1 it is apparent that, with a comparable average molecular weight, the solid resin of the invention exhibits a significantly higher polydispersity, leading to a lower solution viscosity in the adhesive formulation. This relationship is also clearly apparent from a comparison of Inventive Example 2 with Comparative Example 6 and of Inventive Example 3 with Comparative Example 7.

TABLE 1

|  | Inv. Ex. 1 | Inv. Ex. 2 | Inv. Ex. 3 | Inv. Ex. 4 |
|---|---|---|---|---|
| Regulator type | BuAl | BuAl | BuAl | BuAl |
| Regulator amount [% by weight] | 1.6 | 1.64 | 1.64 | 1.64 |
| Start of metering CR + x [h] | 1.5 | 2 | 3 | 4 |
| Mol. weight [Mw] | 140,000 | 270,000 | 380,000 | 800,000 |
| Mol. weight [Mn] | 22,000 | 31,000 | 28,000 | 32,000 |
| Polydispersity Mw/Mn | 6.4 | 8.7 | 13.5 | 25.0 |
| Höppler viscosity* | 10 | 18 | 48 | 280 |
| Brookfield viscosity** adhesive [mPas] | 500 | 1200 | 2400 | 21,000 |
| Tensile shear strength [N/mm$^2$] | 13.7 | 13.7 | 14.0 | 13.0 |

|  | Comp. Ex. 5 | Comp. Ex. 6 | Comp. Ex. 7 | Comp. Ex. 8 |
|---|---|---|---|---|
| Regulator type | BuAl | BuAl | BuAl | BuAl |
| Regulator amount [% by weight] | 0.8 | 0.5 | 0.3 | 0.2 |
| Start of metering CR + x [h] | 0 | 0 | 0 | 0 |
| Mol. weight [Mw] | 150,000 | 250,000 | 400,000 | 715,000 |
| Mol. weight [Mn] | 42,000 | 66,000 | 105,000 | 120,000 |
| Polydispersity Mw/Mn | 3.6 | 3.8 | 3.8 | 6.0 |
| Höppler viscosity* | 12 | 22 | 52 | 180 |
| Brookfield viscosity** adhesive [mPas] | 700 | 1600 | 5300 | 28,000 |
| Tensile shear strength [N/mm$^2$] | 15.0 | 13.7 | 14.9 | 13.3 |

BuAl = n-butyraldehyde,
CR = commencement of reaction,
*= 10% strength in ethyl acetate at 20° C. to DIN 53015
**= Inventive Examples 1 to 3 and Comparative Examples 5 and 6 were measured using spindle no. 3 at 20 rpm and 23° C.
Inventive Example 4 and Comparative Example 7 were measured using spindle no. 4 and no. 6, respectively, at 20 rpm and 23° C.

The invention claimed is:

1. Polyvinyl ester compositions comprising solid resins in the form of particles, prepared by free-radically initiated suspension polymerization, having a polydispersity PD of $\geqq 5$ for a weight-average molecular weight Mw of <300,000 and a polydispersity PD of $\geqq 10$ for a weight-average molecular weight Mw of 300,000 to 1,500,000, wherein the particles have a diameter of from 0.1 mm to 3.0 mm.

2. Polyvinyl ester compositions comprising solid resins, prepared by free-radically initiated suspension polymerization, having a polydispersity PD of 5 to 10 for a weight-average molecular weight Mw of 100,000 to <300,000, a PD of 10 to 20 for a weight-average molecular weight Mw of 300,000 to 500,000, and a PD of 15 to 50 for a weight-average molecular weight Mw of 500,000 to 1,500,000.

3. The polyvinyl ester composition of claim 1, which comprises a solid polyvinyl acetate resin.

4. The polyvinyl ester composition of claim 2, which comprises a solid polyvinyl acetate resin.

5. The polyvinyl ester composition of claim 1 prepared by free-radically initiated suspension polymerization of a base monomer and comonomers, wherein the comonomers, being different from the base monomer, are copolymerized in an amount of $\leqq 50\%$ by weight, based on the total weight of the monomers.

6. The polyvinyl ester composition of claim 5, comprising solid vinyl acetate-vinyl chloride, vinyl acetate-n-butyl acrylate, vinyl acetate-methylmethacrylate, vinyl acetate-hydroxyethyl acrylate, vinyl acetate-2-ethylhexyl acrylate and vinyl acetate-crotonic acid resins, or copolymers of vinyl chloride with vinyl acetate and unsaturated monocarboxylic or dicarboxylic acids.

7. A process for preparing polyvinyl ester compositions comprising solid resins, prepared by free-radically initiated suspension polymerization, having a polydispersity PD of $\geqq 5$ for a weight-average molecular weight Mw of <300,000 and a polydispersity PD of $\geqq 10$ for a weight-average molecular weight Mw of 300,000 to 1,500,000, comprising free-radically initiated suspension polymerizing in aqueous medium at least one vinyl ester or (meth)acrylate base monomer, and optionally up to 50% by weight, based on the total weight of the monomers, of further monomers copolymerizable therewith, in the presence of one or more molecular weight regulator compounds, wherein the molecular weight regulator compound is added such that the molar ratio of regulator to free monomer increases over the course of the polymerization, and the regulator is metered in only after a monomer conversion of 1% to 50% has been obtained.

8. The process of claim 7, wherein at least one molecular weight regulator compound is selected from the group consisting of aliphatic aldehydes having 1 to 4 C atoms, monohydric or polyhydric alcohols having 1 to 6 C atoms, mercapto compounds having 1 to 12 C atoms, and comonomers with a regulator effect.

9. The solid resin composition of claim 1, further comprising at least one organic solvent.

10. A binder, adhesive, or coating, comprising at least one polyvinyl ester composition of claim 1.

11. In a soundproofing mat, wherein a low profile additive is employed, the improvement comprising including, as at least one low profile additive, a polyvinyl ester composition of claim 1.

12. The solid resin composition of claim 2, further comprising at least one organic solvent.

13. A binder, adhesive, or coating, comprising at least one polyvinyl ester composition of claim 2.

14. In a soundproofing mat, wherein a low profile additive is employed, the improvement comprising including, as at least one low profile additive, a polyvinyl ester composition of claim 2.

* * * * *